United States Patent
Barnett

(10) Patent No.: US 11,618,064 B2
(45) Date of Patent: Apr. 4, 2023

(54) AIRBAG MODULE DEPLOYMENT SYSTEM AND METHOD

(71) Applicant: LIGHTING RESOURCES, LLC, Johnson City, TN (US)

(72) Inventor: Steve Barnett, Johnson City, TN (US)

(73) Assignee: LIGHTING RESOURCES, LLC, Johnson City, TN (US)

( * ) Notice: Subject to any disclaimer, the term of this patent is extended or adjusted under 35 U.S.C. 154(b) by 0 days.

(21) Appl. No.: 17/031,458

(22) Filed: Sep. 24, 2020

(65) Prior Publication Data
US 2022/0088650 A1 Mar. 24, 2022

Related U.S. Application Data

(60) Provisional application No. 62/905,294, filed on Sep. 24, 2019.

(51) Int. Cl.
*B09B 3/00* (2022.01)
*F42D 5/04* (2006.01)
*B09B 101/02* (2022.01)

(52) U.S. Cl.
CPC .................. *B09B 3/00* (2013.01); *F42D 5/04* (2013.01); *B09B 2101/02* (2022.01)

(58) Field of Classification Search
CPC ... F42D 5/04; F42B 33/06; B09B 5/00; B09B 3/00; B09B 21/02; B60R 21/26
USPC .......................................................... 86/50
See application file for complete search history.

(56) References Cited

U.S. PATENT DOCUMENTS

| | | | | |
|---|---|---|---|---|
| 3,906,874 A * | 9/1975 | Jaronko | .................... | F23G 5/20 110/222 |
| 4,378,851 A * | 4/1983 | deVries | .................... | B09B 5/00 169/45 |
| 5,578,110 A * | 11/1996 | Nakasato | .............. | B09B 3/0016 75/403 |
| 5,741,465 A * | 4/1998 | Gregg | ...................... | B09B 3/00 110/237 |
| 6,136,590 A * | 10/2000 | Kruse | ...................... | C05F 9/02 435/262 |
| 9,709,370 B1 * | 7/2017 | Keller | ...................... | F42D 5/04 |
| 10,330,452 B2 * | 6/2019 | Whiting | ................ | B09B 3/0016 |
| 10,710,095 B2 * | 7/2020 | Whiting | .................... | B09B 5/00 |
| 2010/0192757 A1 * | 8/2010 | Martin | ................ | F42B 33/067 86/50 |
| 2013/0186573 A1 * | 7/2013 | Kulesa | .................... | B02C 23/40 156/701 |
| 2019/0168961 A1 * | 6/2019 | Keller | .................. | B65D 90/325 |

(Continued)

*Primary Examiner* — Joshua E Freeman
(74) *Attorney, Agent, or Firm* — Ferguson Case Orr Paterson

(57) ABSTRACT

Systems and methods for deploying airbags are disclosed comprising a conveyor belt having plurality of airbag module deploy boxes. A processing area is included wherein a first end of the conveyor belt passes into the processing area, and wherein undeployed airbag modules are loaded into the plurality of deploy boxes. A deployment area is also included that is separate from the processing area, wherein a second end of the conveyor belt passes into the deployment area. At the deployment area the undeployed airbags are deployed by applying an electrical signal to the undeployed airbag modules. A collection bin is included at the second end of the conveyor belt to collect the deployed airbags.

19 Claims, 14 Drawing Sheets

(56) References Cited

U.S. PATENT DOCUMENTS

2019/0310063 A1* 10/2019 Ross ............... B02C 18/225
2019/0323809 A1* 10/2019 Keller ............... B65B 7/16

* cited by examiner

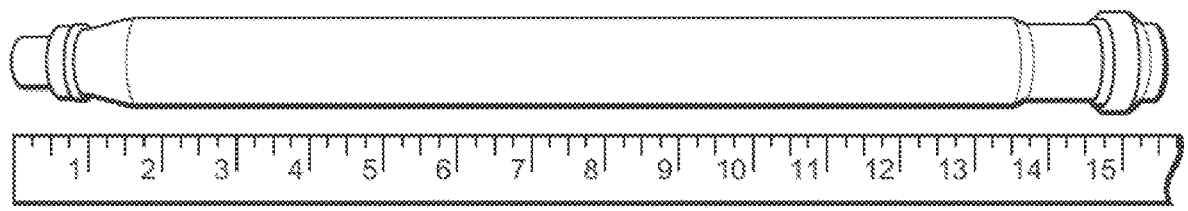
FIG. 9
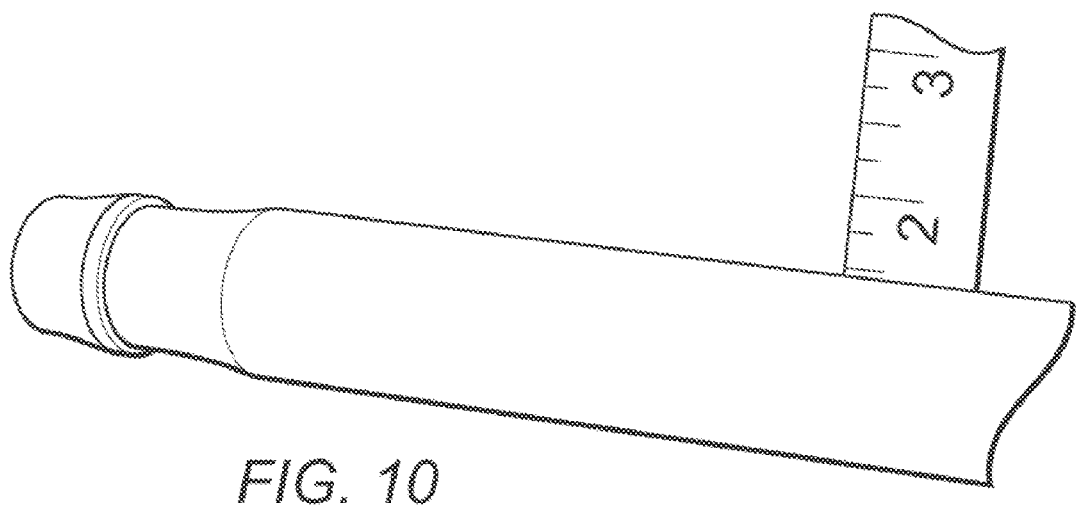
FIG. 10
FIG. 13
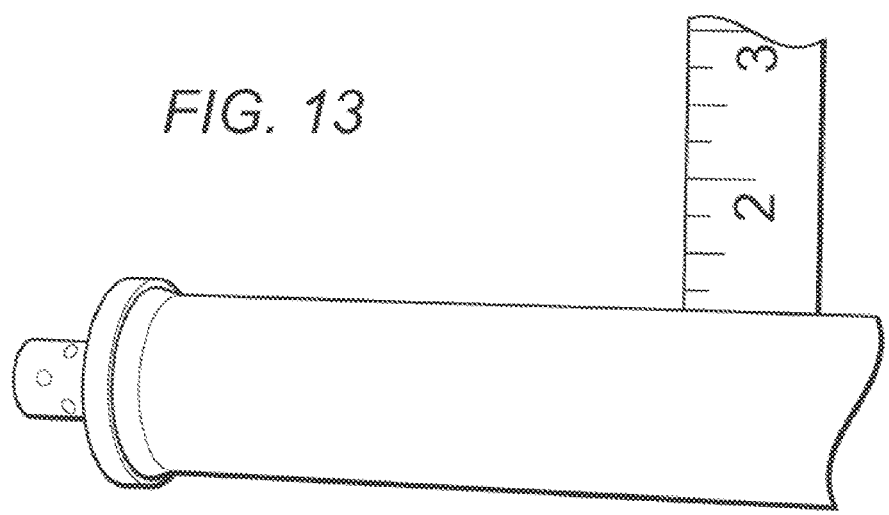

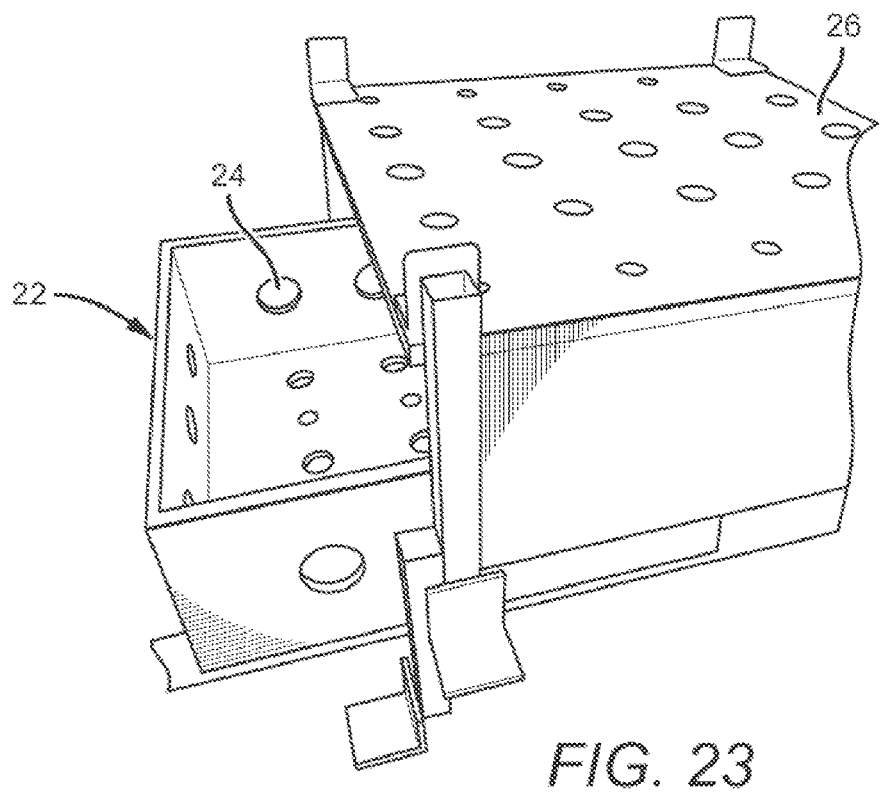
FIG. 23
FIG. 24
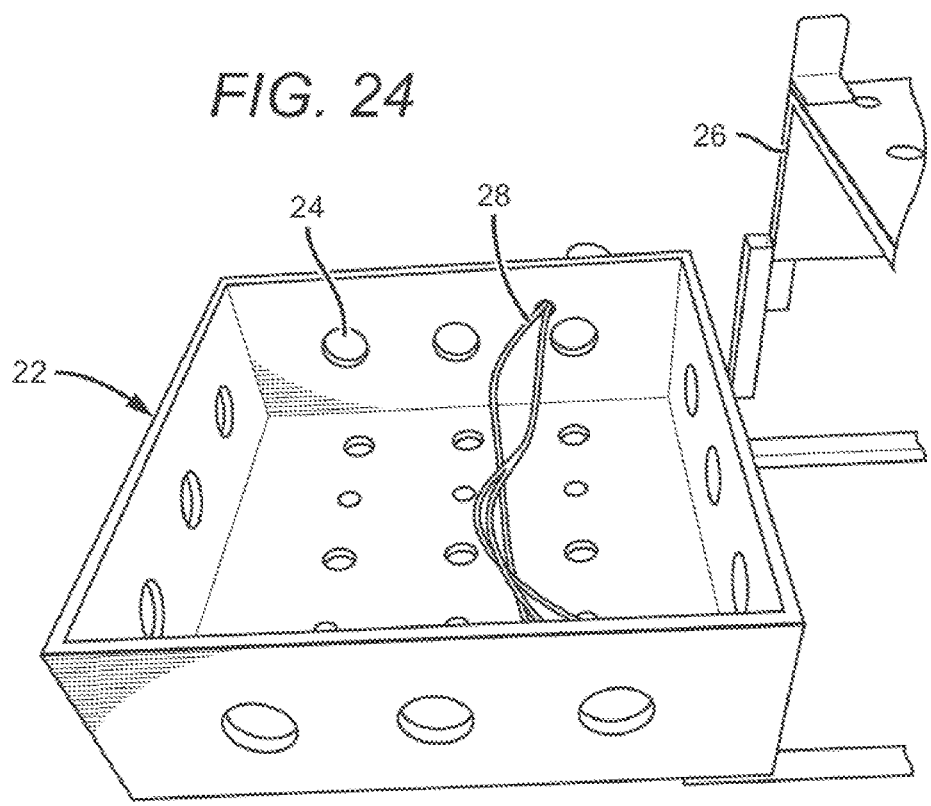

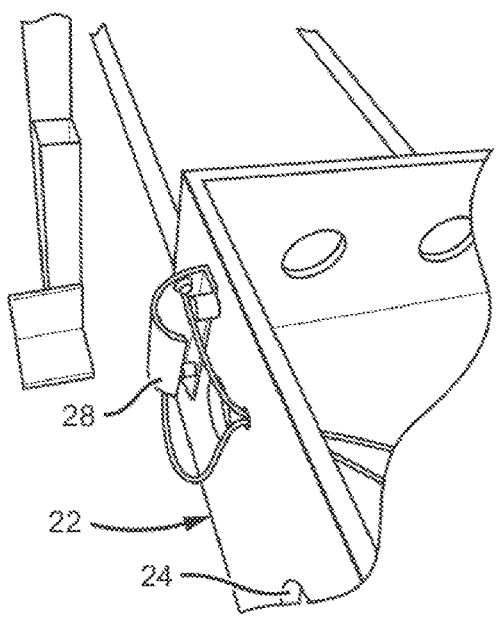
FIG. 25
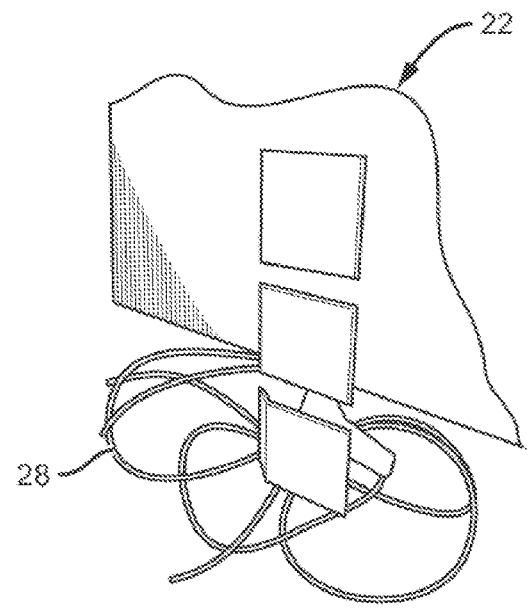
FIG. 26
FIG. 27
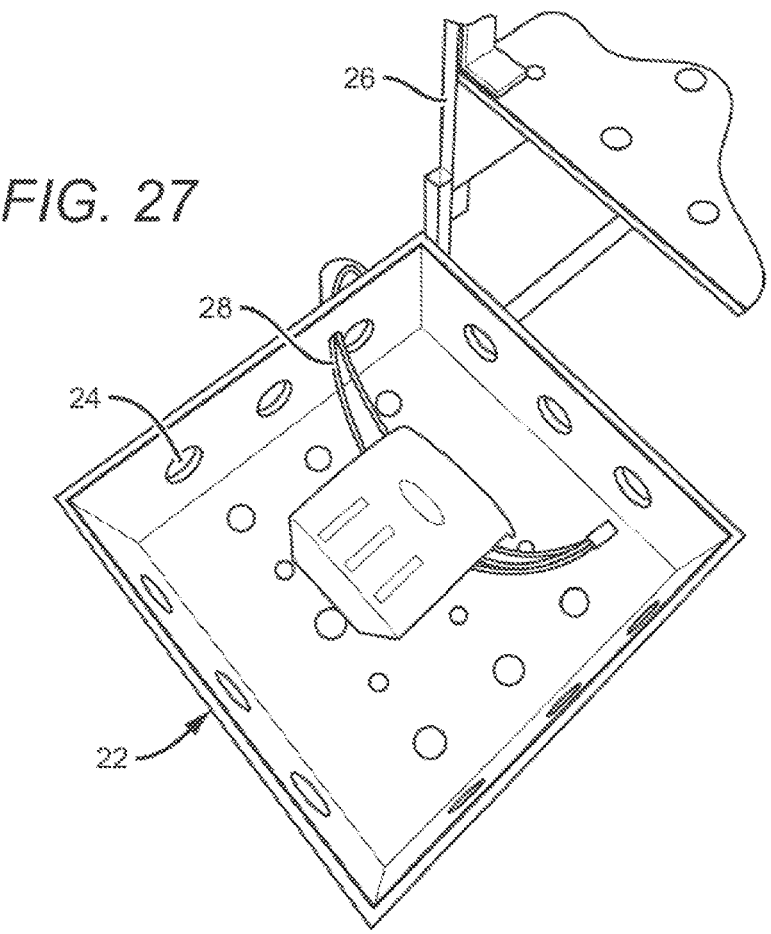

AIRBAG MODULE DEPLOYMENT SYSTEM AND METHOD

This application claims the benefit of U.S. Provisional Patent Application Ser. No. 62/905,294, filed on Sep. 24, 2019.

BACKGROUND OF THE INVENTION

Field of the Invention

This invention relates to vehicle safety airbag modules, and in particular, fixtures, systems and methods for deploying vehicle airbags.

Description of the Related Art

Automotive airbags are one of the most important safety innovations developed to protect passengers during a crash by instantaneously inflating when a serious accident occurs. Frontal airbags have been required in all new passenger vehicles since 1999. Side airbags aren't mandated, but nearly all manufacturers include them, in ever growing numbers, to meet federal protection requirements and to appeal to safety-conscious consumers.

As the world becomes more environmentally conscious there is a push to recycle more and more products. This include vehicles and there components. Often times, a vehicle can be relegated to scrap and recycling even if its airbags have not been deployed. The undeployed airbags can present a danger of deploying during the scrapping process, which can cause injury to those working in the scrap yards.

The undeployed airbags are typically removed prior to the scrapping process. They can either be reused or recycled. For those that are being recycled, the airbag must first be deployed before recycling. What is needed is a safe, fast and cost-effective system and method for deploying airbags so that they can then be safely recycled.

SUMMARY OF THE INVENTION

One embodiment of a system for deploying airbag modules comprising a plurality of airbag module deploy boxes. The system also comprises a processing area for loading undeployed airbag modules in the plurality of deploy boxes. A deployment area is included that is separated from the processing area and for deploying the undeployed airbag modules. A conveyor is also included for conveying the deploy boxes to the deployment area.

One embodiment of a method for deploying airbag modules comprises placing undeployed airbag modules on a conveyor in a processing area. The method includes the further step of conveying the undeployed airbag modules to a deployment area that is separate from the processing area. The method comprises the further steps of deploying the undeployed airbag modules in the deploying area and depositing the now deployed airbag modules in a collection bin.

Another embodiment of a system for deploying airbag modules comprises a conveyor belt having plurality of airbag module deploy boxes. A processing area is included wherein a first end of the conveyor belt passes into the processing area, and wherein undeployed airbag modules are loaded into the plurality of deploy boxes. A deployment area is also included that is separate from the processing area, wherein a second end of the conveyor belt passes into the deployment area. The undeployed airbags are deployed by applying an electrical signal to the undeployed airbag modules. A collection bin is included at the second end of the conveyor belt.

These and other further features and advantages of the invention would be apparent to those skilled in the art from the following detailed description, taken together with the accompanying drawings, wherein like numerals designate corresponding parts in the figures, in which:

BRIEF DESCRIPTION OF THE DRAWINGS

FIGS. 9-23 show different sizes of airbag modules that can be deployed in a system for deploying airbag modules according to the present invention;

FIG. 24 is one embodiment of a bin for holding airbag modules that have been deployed in a system for deploying airbag modules according to the present invention;

FIG. 25 is another embodiment of a bin for holding airbag modules that have been deployed in a system for deploying airbag modules according to the present invention; and FIG. 26 is a perspective view of one embodiment of a deploy box and hood according to the present invention;

FIG. 27 is another perspective view of one embodiment of a deploy box and hood according to the present invention;

DETAILED DESCRIPTION OF THE INVENTION

Figure 1:
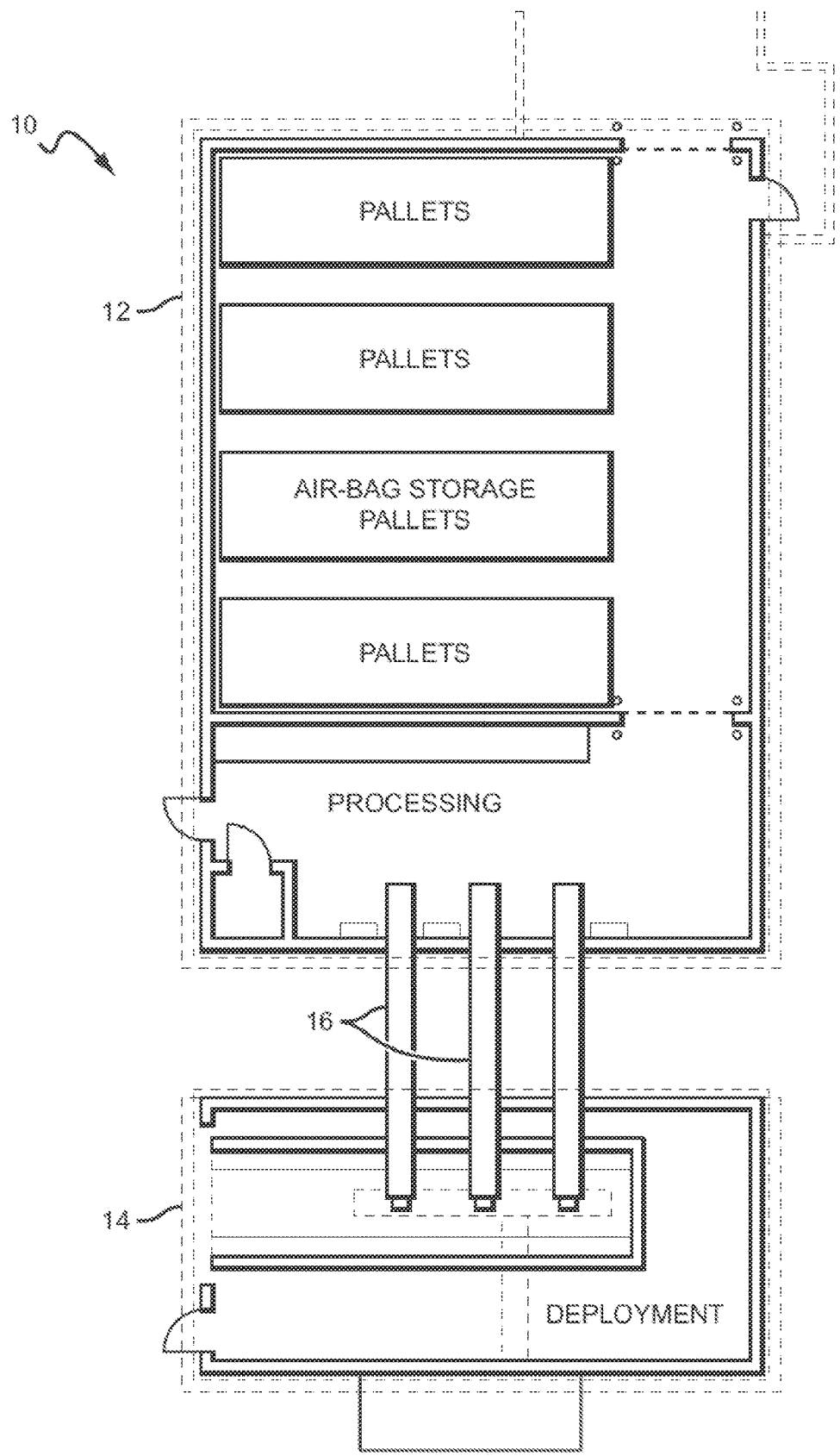
FIG. 1 is a top view of one embodiment of system for deploying airbag modules according to the present invention.
Figure 2:
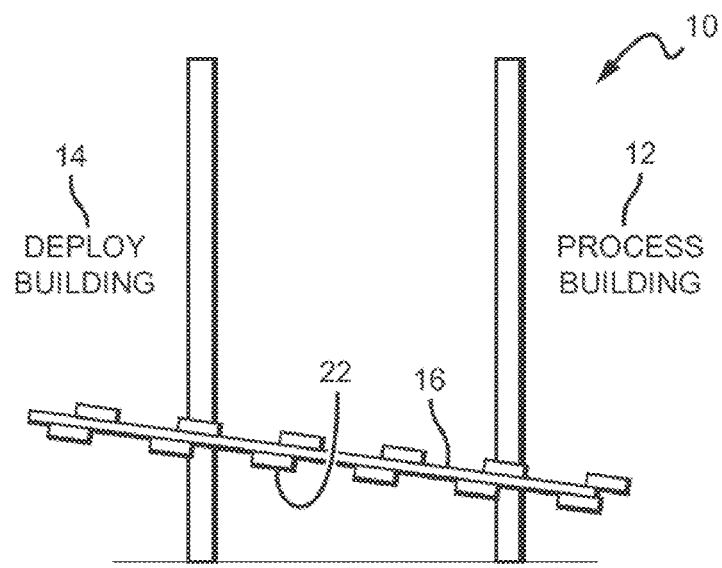
FIG. 2 is a perspective view of one embodiment of system for deploying airbag modules according to the present invention.
Figure 3:
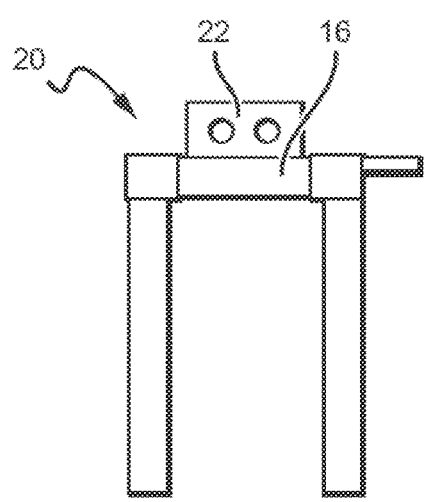
FIG. 3 is another perspective view of one embodiment of system for deploying airbag modules according to the present invention.
Figure 4:
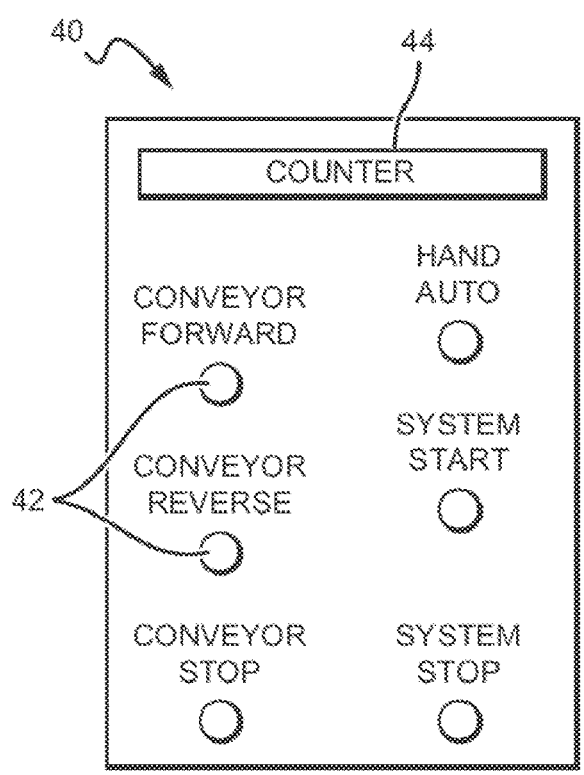
FIG. 4 is a top view of one embodiment of system for deploying airbag modules according to the present invention.
Figure 5:
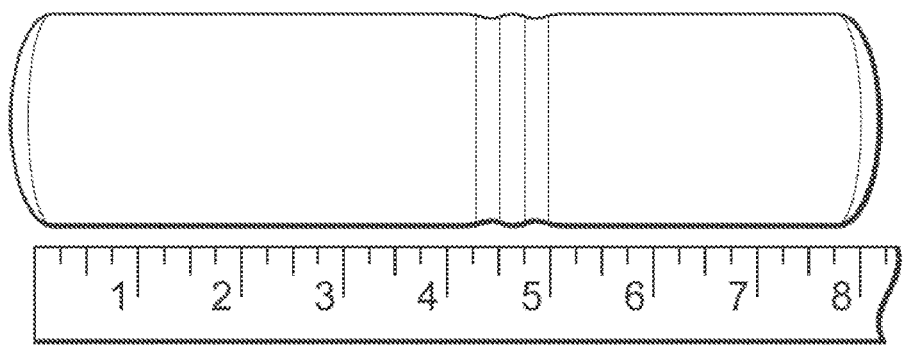
FIG. 5 is a side view of one embodiment of system of a conveyor according to the present invention.
Figure 6:
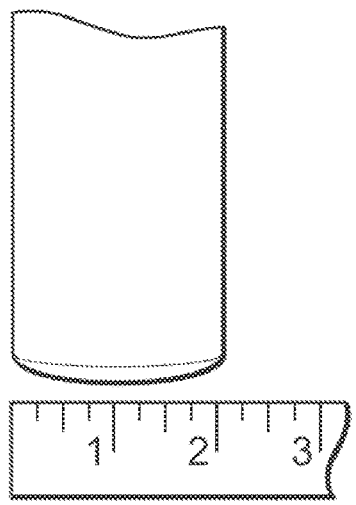
FIG. 6 is a side view of one embodiment of system for deploying airbag modules according to the present invention.

The present invention is directed to an improved system for deploying airbag modules so that they can be safely disposed of or recycled. The systems according to the present invention provide a safe system and process for deploying airbag modules, and also provide a more efficient process for deploying airbag modules. The system generally comprises a processing building where the airbag modules are mounted in a deploy box having an electrical connection to the airbag module. The deploy box with its airbag module is moved to a deployment area where the airbag module can safely be deployed. In some embodiments, the modules can be moved by conveyor belt to separate deployment building. The deploy box can then be moved to the desired location where an electrical signal can be applied to the airbag causing it to deploy. The deployed airbag module can then be deposited in a hopper or bin. This process can be repeated to quickly and safely deploy the airbag modules.

The present invention is described herein with reference to certain embodiments, but it is understood that the invention can be embodied in many different forms and should not be construed as limited to the embodiments set forth herein. It is further understood that different embodiments can comprise different features, elements and materials arranged in different ways, that can operate in different ways.

It will be understood that when an element is referred to as being "on" or "connected to" another element, it can be directly on, or in contact with the other element or intervening elements may be present. In contrast, when an element is referred to as being "directly on", or "directly connected to" another element, there are no intervening elements present. Although the terms first, second, etc. may be used herein to describe various elements, and/or sections, these elements and/or sections should not be limited by these terms. These terms are only used to distinguish one element, or section from another element, or sections. Thus, a first element or section discussed herein could be termed a second element, or section without departing from the teachings of the present invention.

Embodiments of the invention are described herein with reference to certain illustrations that are schematic illustrations of an embodiment of the invention. As such, the actual thickness or size of components can be different, and variations from the shapes of the illustrations as a result, for example, of manufacturing techniques and/or tolerances are expected. Embodiments of the invention should not be construed as limited to the particular shapes as illustrated herein but are to include deviations in shapes that result, for example, from manufacturing. A region or element illustrated or described as being generally square or rectangular can have rounded or curved features due to normal manufacturing tolerances. Thus, the features illustrated in the figures are schematic in nature and their shapes are not intended to illustrate the precise shape of a feature of a device and are not intended to limit the scope of the invention.

FIGS. 1-6 show different components of one embodiment of an air bag deployment system 10 according to the present invention. Different embodiments can comprise a processing building 12 and a deployment building 14, with one or more conveyers 16 (e.g. conveyor belts) between the two. In some embodiments, the conveyors 16 can be different lengths that run in different ways between the buildings. In other embodiments the conveyors 16 can be approximately the same length and can run outdoors between the buildings. In some embodiment, where the conveyors 16 run between the building they can fully covered, while in other embodiments they can be covered under a roof and the sides can be exposed to the ambient conditions.

During operation of the airbag deployment system 10, one or more system operators in the processing building 12 can load the conveyors 16 with undeployed airbag modules. In other embodiments, the system 10 can comprise systems to automatically load the undeployed air bags, such as by robots.

Figure 7:
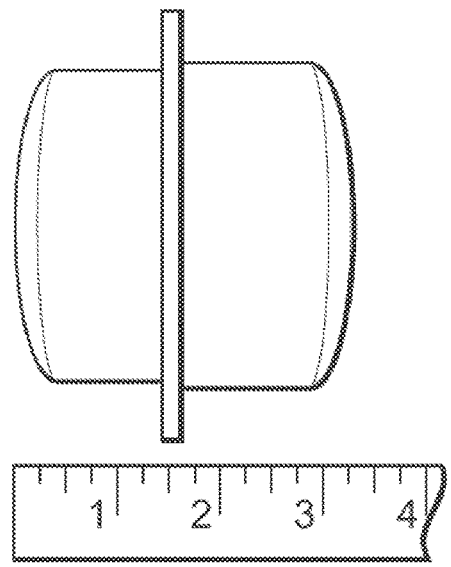
FIG. 7 is a side view of a workstation in one embodiment of a system for deploying airbag modules according to the present invention.

FIG. 7 shows one embodiment of an operator station 20 according to the present invention where undeployed airbag modules can be loaded in the system for deployment. In the embodiment shown, this can occur in the processing building 12 shown in FIGS. 1 and 2 and described above. In the embodiment shown, the operator can stop the conveyor 16, plug an undeployed airbag module into to a deployment wire connection (described below) from the deploy box 22 that is on one of the conveyors 16, and place the now connected module unit in the deploy box 22. An operator control panel 40 can be included at each conveyor 16, with one embodiment of a control panel 40 shown in FIG. 8 and described below.

Some embodiments of the present invention can comprise system for confirming that the wire has been properly connected to the airbag module, and can comprise and indicator for signaling to the operator of the connection. In some embodiments, this can comprise a low voltage carried by the deployment wire that is below the level that would deploy the airbag module. When the deployment wire is properly connected, the low voltage electrical signal can conduct to the airbag module, and this conduction could activate light at the control panel to confirm proper connection. The conveyor could then move forward for loading the next airbag module in the next deploy box 22.

The conveyors 16 can then transport the deploy box 22 having the undeployed airbags to the deployment building 14. In the deployment building 14 the deploy box 22 can travel under a hood located at a deploy station in the deploy building 14. An electrical signal can then be applied to the airbag module causing the airbag module to deploy. As provided in more detail below, the electrical signal can comprise a 12V signal transmitted to the air bag causing the airbag to deploy. In the deployment building 14, the conveyor 16 can continue forward upon proper air bag deployment and the deployed air bag can be fed into a hopper or bin located at or near the end of the conveyor.

The deployment building 14 and processing building 12 can be separated by many different distances, which the embodiment shows having a separation distance between the exteriors of the buildings of approximately 11 feet. Different conveyors 16 in different embodiments can have different lengths, with some embodiments having a horizontal length in the range of 20-25 feet. In some embodiments, the conveyors can have a length of around 23.4 feet. The drive system for the conveyors can be located in different locations, and in the embodiment shown can be located in the processing building 12 as close to the building wall as possible.

The conveyors 16 can be driven using many different mechanisms, with the conveyors in some embodiments being driven by an electric motor. In some embodiments, the motors can conform to the following requirements; NEMA MG-1 hazardous area rated, temperature T3, foot mounted, F-1 box, 480/3/60. The Motors can be inverter duty, and can be provided with starters. The drive systems can include gearboxes that can be sized to maintain a constant speed, and the system can comprise a skid that can be sized so it can be installed at the operator end of the conveyor in the desired location, such as next to the a wall in the processing building 12. Junction boxes can be provided in many different locations, and in some embodiments can be located for ease of installation and maintenance. Each junction box shall be positioned so there is a minimum clearance in compliance with industry standards (e.g. NEC).

In some embodiments, the conveyors 16 can be identical in design and operation, while in other embodiments they can be different in design and operation. In some embodiments, the conveyors 16 and deploy boxes 22 can be capable of working with many different types and sizes of airbag modules. FIGS. 9 through 23 show just some of the airbag modules that can be deployed using the system according to the present invention. These different airbags can range in length from less that few inches long or wide, to more than 12 inches long. The deploy boxes 22 according to the present invention should be sized to safely accommodate these different sizes of airbag modules and should have wiring to efficiently and safely connect to these modules. The conveyors 16 should be robust and reliable and can be designed to operate continuously for up to sixteen hours per day, five days per week, for up to fifty-two weeks per year. The system should be designed to have a long operational life span, such as a life span of up to twenty years.

The deployment systems according to the present invention can have conveyors 16 that operate at different speeds and deploy airbags at different rates. In some embodiments, that airbag deployment rate can be one (1) airbag every 10 seconds at an approximate conveyor speed of 30 feet per minute. In other embodiments, the system can be arranged with a shorter or longer deployment rate, with a slower or faster conveyor speed. As discussed above, the conveyors 16 can operate in both forward and reverse direction, and each conveyor 16 can operate independently of the others. It is understood that in other embodiments less than all of the conveyors 16 can operate independently, and in some embodiments all the conveyors 16 operate in unison.

The conveyors 16 shall be designed to operate indoors and outdoors, without significant impact to reliability. The conveyors 16 should comprise a robust design to resist or prohibit any damage from the airbag deploy forces. The deploy boxes and deploy stations should be designed to safely withstand the forces created during multiple airbag deployments, while allowing for the deploy gases to escape.

Each conveyor 16 can be sized to fit in wall openings in the processing building 12 and deployment buildings 14. In some embodiments, the conveyors 16 can be 24 inches wide or less to fit into building wall openings that are approximately 2 feet, 8 inches wide. The conveyor building wall openings can be 3 to 4 feet apart. The conveyors can be arranged at many different angles and elevations.

A ventilation hood (not shown) can be provided above each conveyor for the evacuation of the deployment off-gases. The ventilation holes, slot or other designs in the deploy boxes and the deploy station hood shall be sized to prevent the escape of any airbag module components prior to or after deployment. Conveyor supports can be in many different location, with some embodiments having supports located as close to the building walls as possible (with the exception of the operator end of the conveyor). The conveyor supports can be anchored in many different ways and in many different locations, with some embodiments being bolted to concrete.

A deploy station is provided in the deployment building 14 where the air bags can be deployed using many arrangements according to the present invention. In one embodiment and as discussed above, a 12 VDC signal, with the necessary amperage, can be used to deploy each airbag. When the deploy box 22 is moved by conveyor under the deploy station hood, the 12V signal is sent to the airbag causing deployment. Each airbag module can have one or two electrical connections, at least one of which can carry the 12V signal. Many conventional airbag modules have two-pin connection such as a clock spring connections. The wires that connect the deploy box 22 to the airbag module shall be easily replaceable since the airbags wires can become disconnected at the time of the deployment. It is acceptable for the wires to fall into the hoppers with the deployed airbags. The wires, fins, flaps or other methods that transmit the 12V signal from the deploy hood to the airbag module shall be robust enough to repeatedly cycle at the rate described herein. These, however, can be considered wear parts and should be easily replaced as required.

Many different controllers can be used to move the deploy box to the desired location on the conveyor belt, such as when the deploy box 22 is in the proper location to deploy the airbag module. In some embodiments, a photo eye can be included that detects when the deploy box 22 is in position at end of the conveyor 16 for airbag module deployment. The image from the photo eye can automatically stop the conveyor 16, or an image can be transmitted to the operator and the conveyor 16 can be manually stopped by the operator. A light can be provided to the operator, such as at the control panel, to notify the operator when the conveyor 16 is safe to proceed to move a new airbag module in place for deployment. Each drive system and conveyor shall be provided with lock out or tag out capabilities.

The system 10 according to the present invention can detect the proper airbag deployment and transmit a signal to the operator panel via a counter to alert the operator of the deployment. The counter can be a digital display that can be reset, typically at the beginning of each operator shift. The operator can control the conveyor in many different ways, and in some embodiments the operator can use a foot pedal or a push button on the control panel to start conveyor operation in the forward direction. Foot pedal can be used start the conveyor in the forward direction and stop the conveyor. In some embodiments, the foot pedal can also be used to reverse the conveyor direction. In these embodiments, reverse conveyor direction can only occur due to mis-deployment of the airbag module or through the control panel button. Audible warning signal announcing the startup of the conveyor can be provided on either the control panel or the drive system skid.

If the airbag does not properly deploy in response to an electrical signal, the systems 10 according to the present invention can take different actions. In some embodiments, if the airbag does not deploy at the deploy station, the conveyor can automatically stop, reverse direction, and move the deploy box 22 forward in another attempt to deploy the airbag. A 12 v signal can again be transmitted to the air bag in another attempt to cause its deployment. The operator will be able to control this operation, and can stop the conveyor and reverse the conveyor via the operator control panel (discussed below). After two failed deployment attempts, the conveyor 16 can continue to travel in the forward direction unless otherwise controlled by the operator.

It is understood that other embodiments can be arranged to attempt more than two deployments before moving forward. In some embodiments, if the deployment fails after the pre-determined number of times (such as two) the system according to the present invention can be arranged to move these undeployed airbag modules (deployment failed) to a separate hopper or bin specifically designated for these units. It is noted, however, that the systems according to the present invention should relatively few deployed failure modules and the use of the separate hopper/bin should be relatively rare.

An emergency stop ("e-stop") can be provided on each conveyor drive system in a location easily accessible by the operator. Some embodiment can also comprise a lanyard emergency stop that can be connected to the user. Pulling of the lanyard connection can cause the system to stop. Most systems can be arranged so that no operators should be allowed in the deployment building 14 during conveyor operation. Notwithstanding, there can be an emergency stop for each conveyor 16 in the deployment building 14 and the processing building 12.

The deployment and processing buildings 14, 12 can be climate controlled to keep the buildings at the desired temperatures during the warmer or cooler months. Both buildings can be supplied with room mounted exhaust fans.

The conveyor 16 shall contain enough deploy boxes to meet the desired processing speeds and conditions. FIGS. 26 to 31 show one embodiment of a deploy box 22 according to the present invention. Deploy boxes 22 can be many different shapes and sizes, and can be arranged in many different ways to accommodate safe and repeated deployment of different airbag modules of different sizes. In some embodiments the deploy boxes 22 can be approximately 12" wide by 18" long and 6" tall.

Each deploy box 22 can have wires 28 for applying a deployment electrical signal to its airbag module, and ventilation holes 24 to allow deployment exhaust to escape from the deploy box following airbag deployment. Different embodiments can use covers to close the deploy box 22 prior to airbag deployment. In other embodiments, the deploy box 22 can move under a deploy station hood 26 to provide a fixed cover over the deploy box 22 during airbag deployment. The deploy station hood 26 can be arranged in many different ways, with some having a minimal clearance for the deploy box of 2 to 3". The clearance shall be sufficient space to allow for the air bag to deploy, but the space shall not be large enough for airbag modules to escape the conveyor during deployment.

Figures 32, 33, 34:
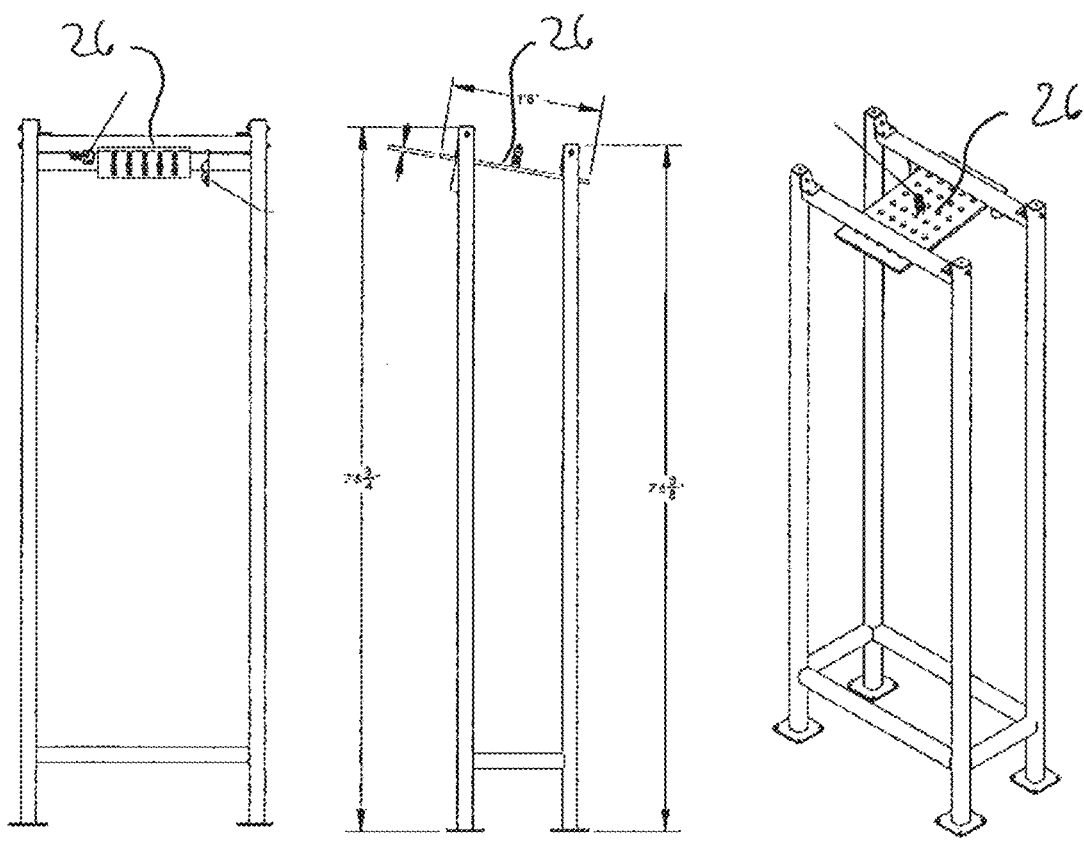
FIG. 32 is a front view of one embodiment of hood stand according to the present invention.
FIG. 33 is side view of one embodiment of hood stand according to the present invention.
FIG. 34 is a perspective view of one embodiment of hood stand according to the present invention.

FIGS. 32 to 34 show one embodiment of a deploy station hood stand 30 according to the present invention that can be arranged at the location in the deployment building where the airbag modules are deployed. Each hood stand 30 can comprise a deploy box hood 26 that can be positioned over the top of the deploy box when the airbag module is deployed, with the hood 26 safely containing or deflecting at least part of the forces and gasses that result from deployment of the airbag module.

The deployed airbag can be removed from the deploy boxes 22 in many different ways, and in some embodiments the modules can gravity drop or feed into a hopper or bin at the end of the conveyor in the deployment building. Many different hopper designs can be used according to the present invention, with the following describing only two possible hopper designs. FIGS. 24 and 25 show embodiments of a hopper 32 and bin 34, respectfully, that can be used according to the present invention. The hopper 32 shown in FIG. 24 can be mounted to a pivot point that allows for the hopper 32 to be in the upright and fill position 32a for filling of the hopper 32. When the hopper 32 is full or ready for dumping, is can be rotated about the pivot point to the dump position.

Some embodiments can be a standard open top roll off dumpster design 34 as shown in FIG. 25, and the others can be self-dumping forklift hopper. The hoppers and dumpsters can be located at or near the deployment building and at the end of the conveyor at a location where the deployed airbag modules can fall into the hopper or dumpster after deployment, such as when the deploy boxes transition from the upright to inverted positions on the conveyor. In some embodiments, the hoppers or dumpsters should be located so the conveyor 16 extends approximately 3 feet over the top of hopper or dumpster. As can best be seen in FIGS. 5 and 6, the conveyors 16 can be angled up from the processor building 12 to the deployment building 14 so that the conveyor is at the proper height above the hopper/dumpster in the deployment building 14. The conveyor shall be designed so the deploy boxes have a minimum of 6" clearance to the hoppers or dumpsters. The conveyor supports shall be positioned as to not interfere with the hopper/dumpster placement. A hopper e-stop for each conveyor can be provided at the deployment station near the end of the conveyor. The e-stops can be located so they are easily accessible regardless of the hopper type utilized.

Figure 8:
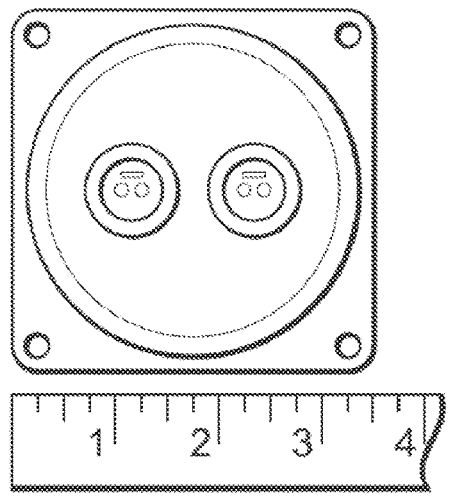
FIG. 8 is a plan view of one embodiment of a control panel that can be used in a system for deploying airbag modules according to the present invention.
Figure 11:
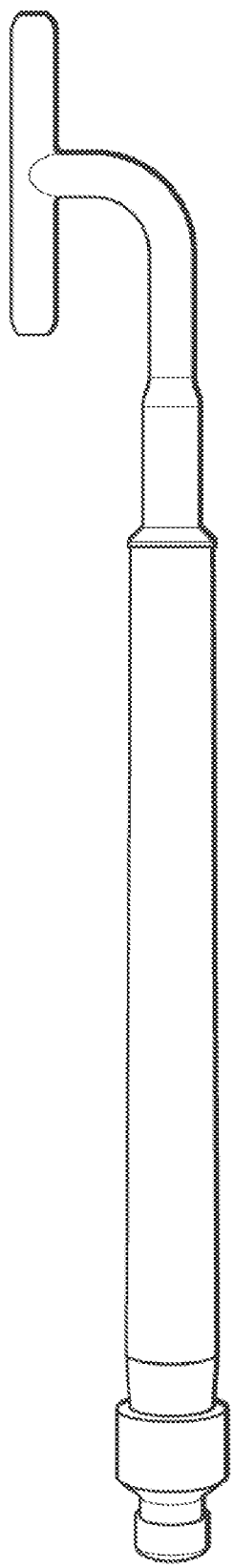
Figure 12:
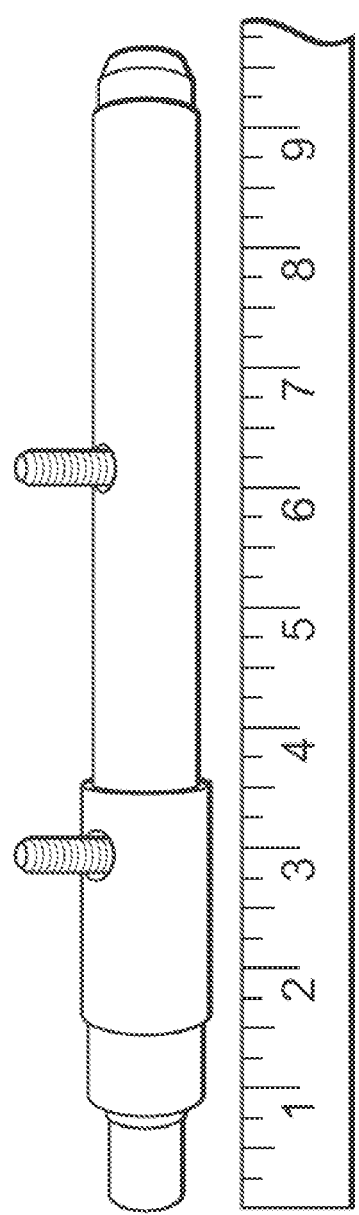
Figure 14:
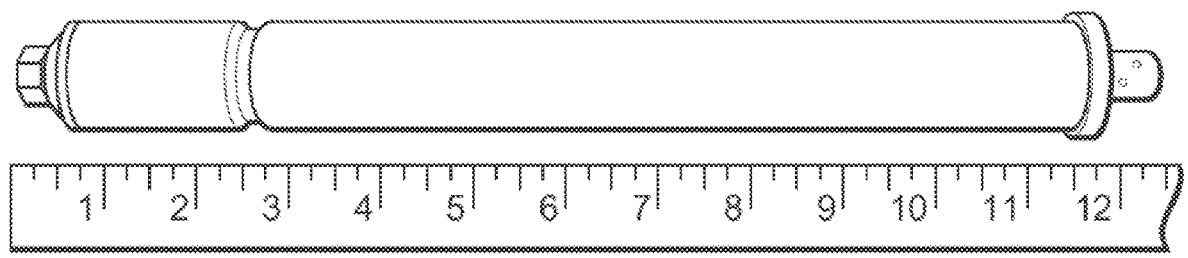
Figure 15:
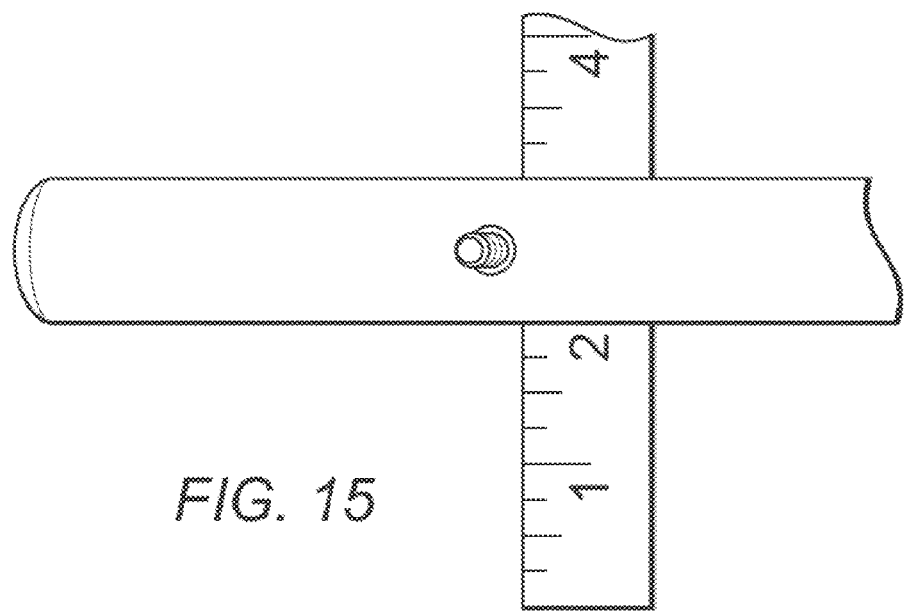
Figure 16:
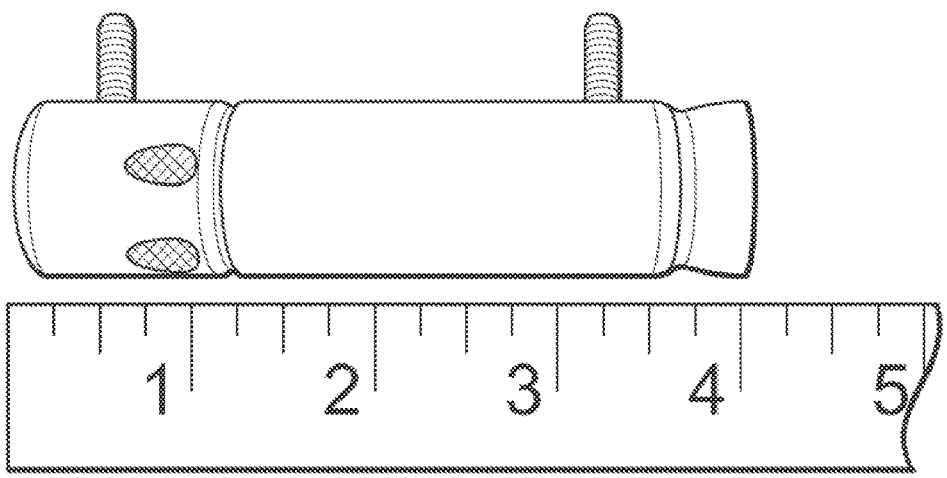
Figure 17:
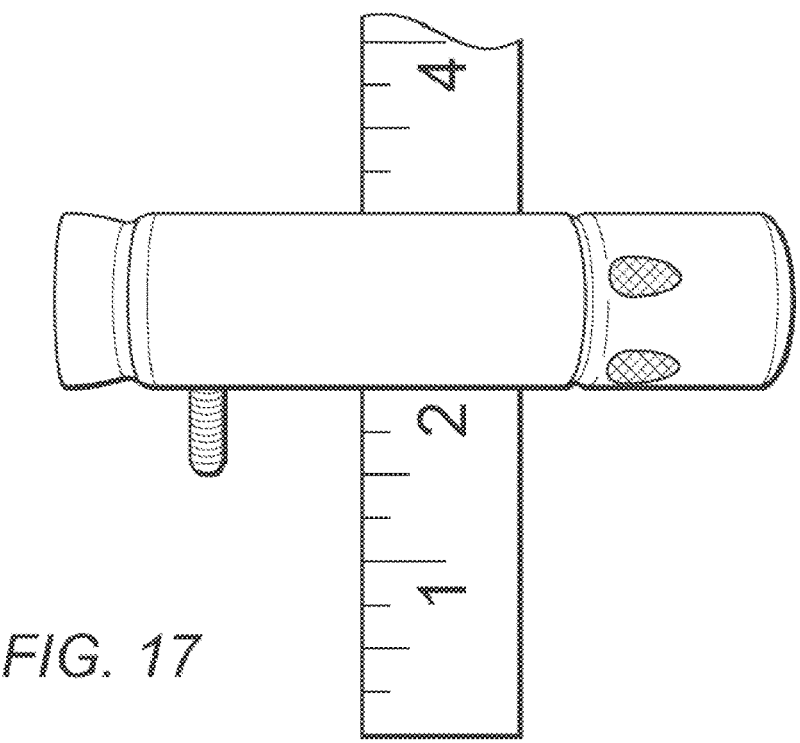
Figure 18:
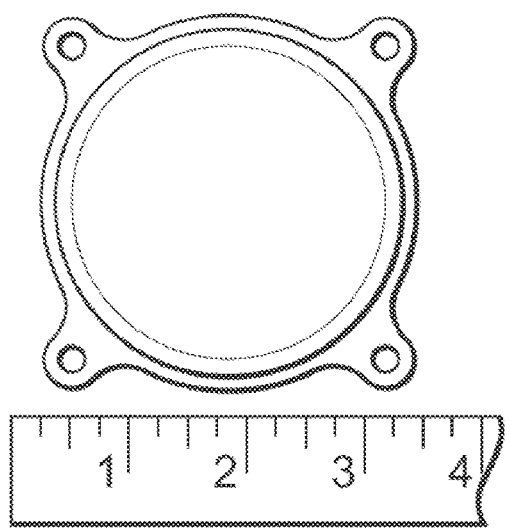
Figure 19:
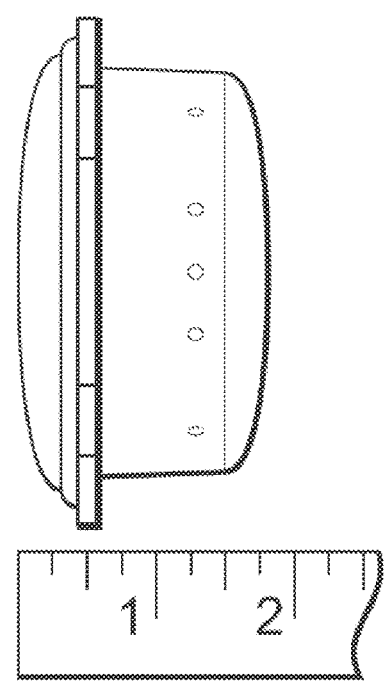
Figure 20:
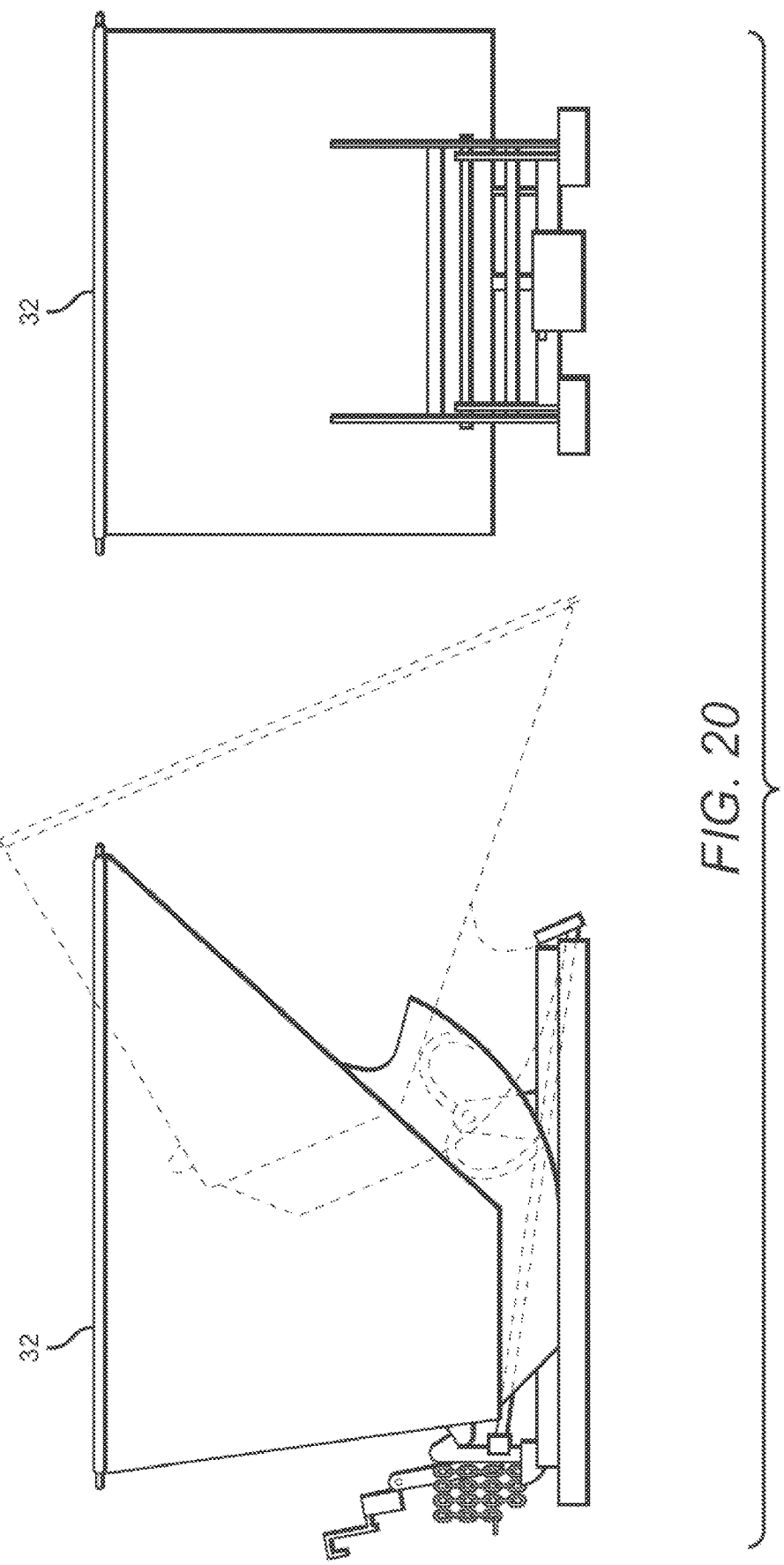
Figure 21:
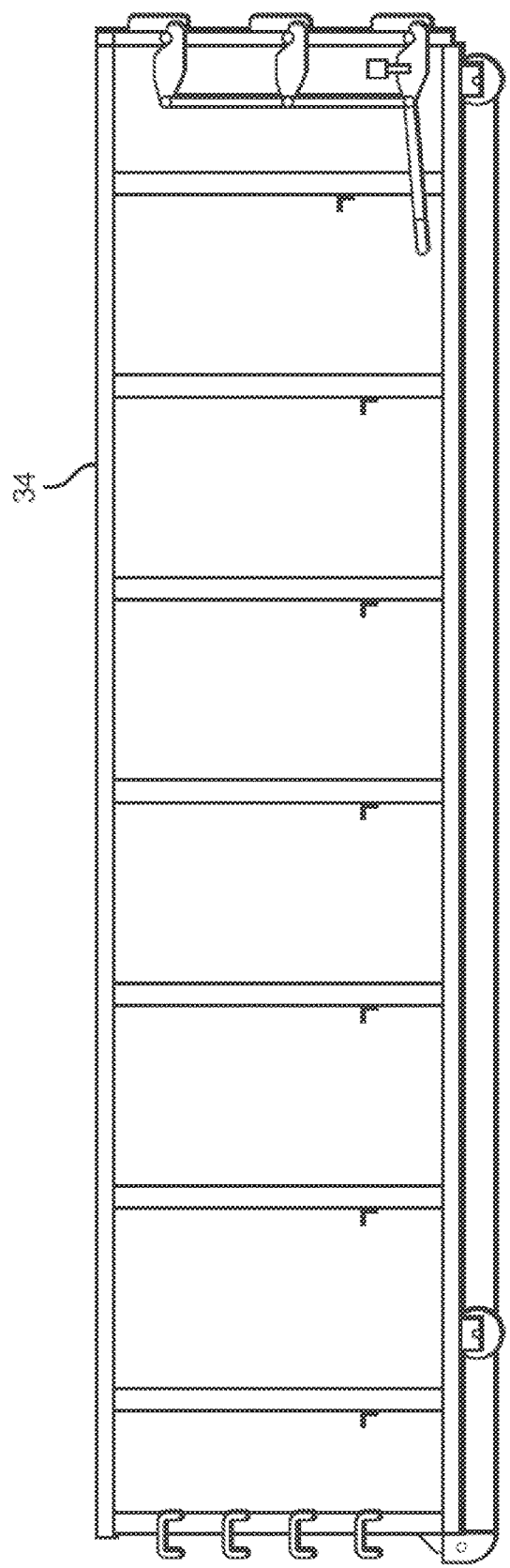
Figure 21:
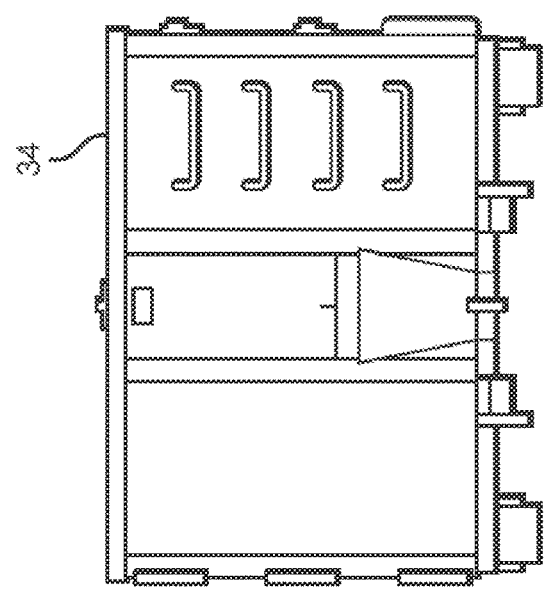
Figure 22:
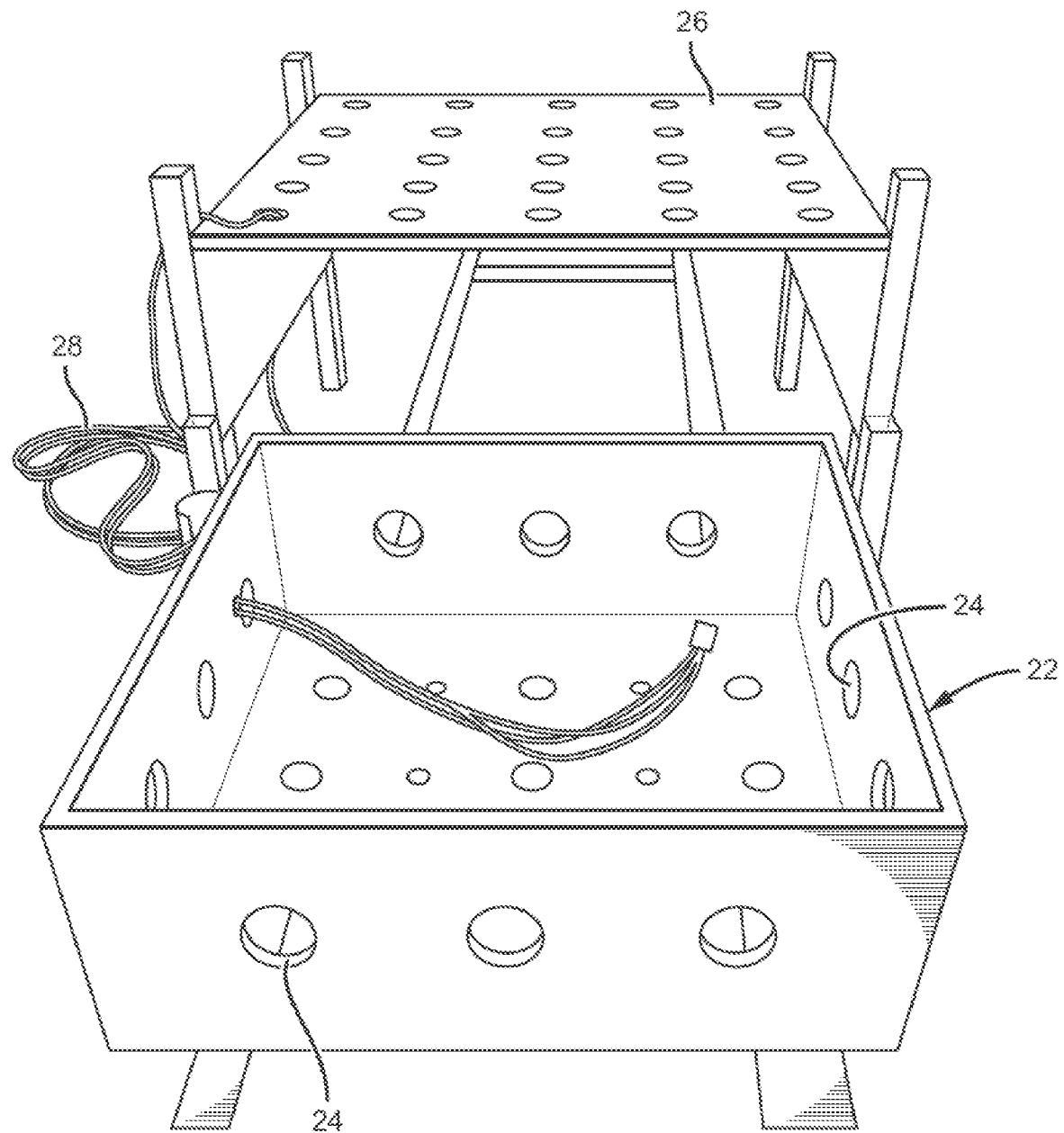
Figure 28:
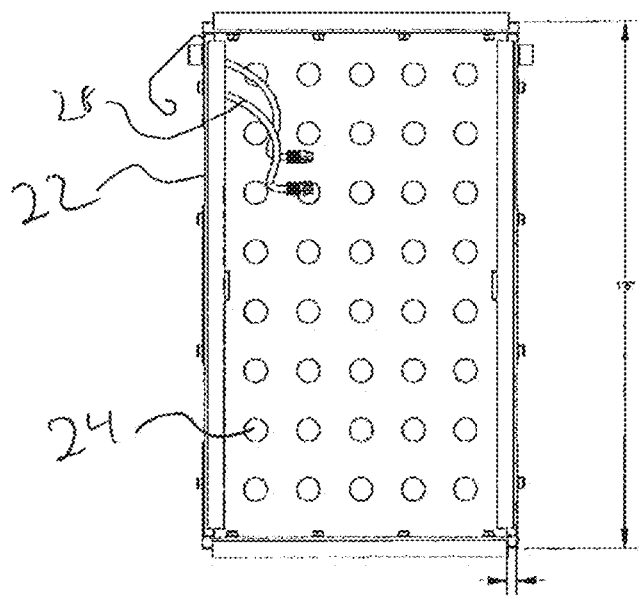
FIG. 28 is a top view of one embodiment of a deploy box according to the present invention.
Figure 29:
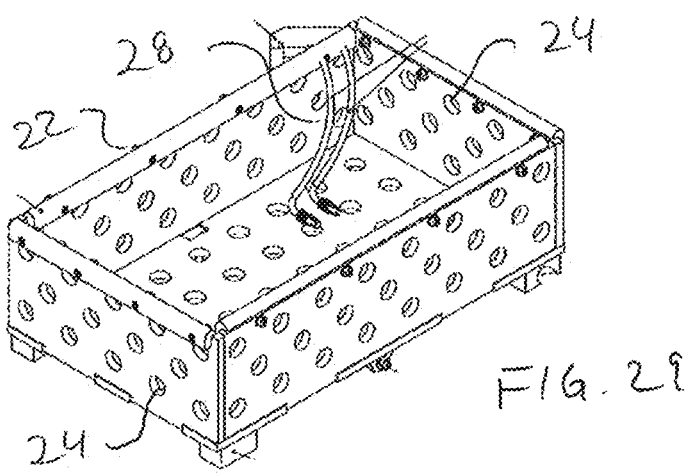
FIG. 29 is a perspective view of one embodiment of a deploy box according to the present invention.
Figure 30:
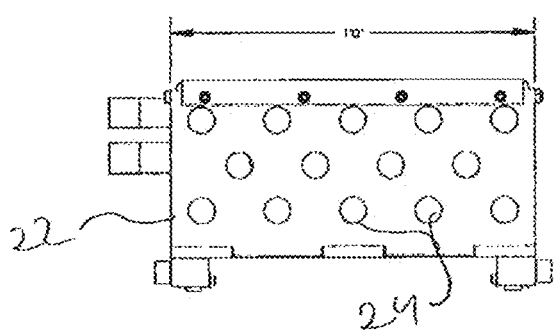
FIG. 30 is a side view of one embodiment of a deploy box according to the present invention.
Figure 31:
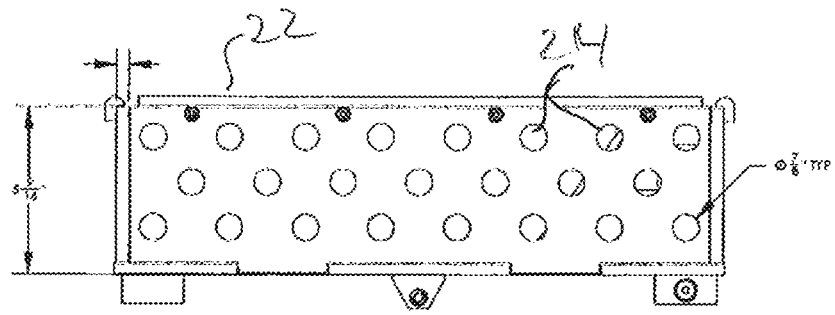
FIG. 31 is a front view of one embodiment of a deploy box according to the present invention.

Each conveyor shall be provided with an operator control panel mounted on the conveyor frame. FIG. 8 shows an example of a control panel 40 according to the present invention. The preferred operator interface can be via push buttons 42, but manual knobs shall be provided as required by OSHA and ANSI. The preferred control panel should meet all OSHA, ANSI and NEC requirements. The control of the conveyors can occur by buttons and knobs on the control panel or via a corded foot pedal. The control panel should conform to applicable national and local codes and standards. The counter 44 can have reset on the operator control panel, and the counter readout can be digital. Lock out and tag out capabilities can be included on the control panel. The conveyor, or other mechanisms in the deployment building, can count each airbag deployment and send a signal to the counter 44 on the operator control panel 40.

A power control panel can also be included, that can be in many different locations and should contain all power distribution, inverters, controls and protection. A plant disconnect can be provided with a 480 V 3-phase power to this panel. All I/O and motor wiring can come from this panel to the each conveyor. Each drive motor can have an inverter supplied in the power control panel. The panel can be mounted near the processing building wall at the operator end of the conveyors. The processing building area housing this equipment is considered Class 1 Div 2, so the panel shall be NEMA 4x provided with purge.

The deployment and processor buildings according to the present invention can be designated as explosion proof areas, so all electronic equipment shall conform to the high hazardous area ratings. All electrical enclosures and junction boxes should be NEMA 4X, and both the building should be both explosion proof, Class 1 Div 1 Group E.

It is understood, however, that the buildings and their components need not comply with the above standards and requirements, and can have many different ratings. Other embodiments of the systems according to the present invention could be provided using standard building materials, standard electrical controls and standard wiring.

It is also understood that many different mechanisms and arrangements can be used in the different systems according to the present invention. Although the present invention has been described in detail with reference to certain configurations thereof, other versions are possible. Therefore, the spirit and scope of the invention should not be limited to the versions described above.

I claim:

1. A system for deploying airbag modules, comprising:
a plurality of airbag module deploy boxes;
a processing area for loading at least one undeployed airbag module in each of said plurality of deploy boxes, wherein said deploy boxes comprise wires to connect to each of its at least one airbag module;
a deployment area separated from said processing area for deploying said at least one undeployed airbag module; and
a conveyor for conveying said deploy boxes to said deployment area.

2. The system of claim 1, wherein each of said deploy boxes holds a single one of said at least one airbag module.

3. The system of claim 1, wherein said wires in each of said deploy boxes are capable of conducting an electrical signal to deploy its at least one airbag module.

4. The system of claim 1, wherein said deploy boxes comprise ventilation holes to allow airbag module gasses to pass.

5. The system of claim 1, wherein said conveyor is a conveyor belt with said deploy boxes mounted to said conveyor belt.

6. The system of claim 1, wherein said deployment area comprises a deployment building and said processing area comprises a processing building.

7. The system of claim 6, wherein said conveyor passes between said processing building and said deployment building.

8. The system of claim 6, wherein said conveyor passes between and into said processing building and said deployment building.

9. The system of claim 1, wherein said deployment area comprises a hood to be arranged over said deploy boxes during deployment of said air bag modules.

10. The system of claim 1, further comprising a bin, wherein said airbag modules are automatically deposited in said bin following deployment.

11. The system of claim 1, wherein each of said deploy boxes holds a multiple of said at least one airbag module.

12. A method for deploying airbag modules, comprising:
placing undeployed airbag modules on a conveyor in a processing area;
conveying said undeployed airbag modules to a deployment area that is separate from said processing area;
deploying said undeployed airbag modules in said deploying area by applying an electrical signal to said undeployed airbag modules; and
depositing said now deployed airbag modules in a collection bin.

13. The method of claim 12, wherein said processing area comprises a processing building and said deployment area comprises a deployment building separated from said processing build by at least one wall.

14. The method of claim 12, wherein said placing step comprises placing each said undeployed airbag module in respective deploy box.

15. The system of claim 12, wherein said conveying step comprises moving said undeployed airbag modules between said processing area and said deployment area on a conveyor belt.

16. A system for deploying airbag modules, comprising:
a conveyor belt having plurality of airbag module deploy boxes;
a processing area wherein a first end of said conveyor belt passes into said processing area, and wherein undeployed airbag modules are loaded into said plurality of deploy boxes;
a deployment area separate from said processing area, wherein a second end of said conveyor belt passes into said deployment area, and wherein said undeployed airbags are deployed by applying an electrical signal to said undeployed airbag modules; and
a collection bin at said second end of said conveyor belt.

17. The system of claim 16, wherein each of said deploy boxes holds a single airbag module.

18. The system of claim 17, wherein said deploy boxes comprise wires that connect to its airbag module for conducting an electrical signal to deploy its airbag module.

19. The system of claim 16, wherein said deployment area comprises a deployment building and said processing area comprises a processing building.

* * * * *